United States Patent [19]

Rettig

[11] Patent Number: 4,488,212
[45] Date of Patent: Dec. 11, 1984

[54] VOLTAGE LIMIT PROTECTION CIRCUIT FOR PHASE CONTROLLED RECTIFIERS

[75] Inventor: Charles E. Rettig, Brookfield, Wis.

[73] Assignee: MagneTek Inc., Milwaukee, Wis.

[21] Appl. No.: 469,561

[22] Filed: Feb. 28, 1983

[51] Int. Cl.³ .............................................. H02H 7/125
[52] U.S. Cl. ........................................... 363/54; 363/52
[58] Field of Search ........... 318/800, 801, 806, 345 G, 318/345 C; 363/52, 53, 54, 84, 85, 87, 128, 129

[56] References Cited

U.S. PATENT DOCUMENTS

| | | | |
|---|---|---|---|
| 3,484,676 | 12/1969 | Wilkerson | 363/128 |
| 4,150,325 | 4/1979 | Miller et al. | 363/54 |
| 4,310,866 | 1/1982 | Wirth | 363/53 |
| 4,423,477 | 12/1983 | Gurr | 363/54 |

Primary Examiner—William M. Shoop
Assistant Examiner—Jeffrey Sterrett
Attorney, Agent, or Firm—John M. Haurykiewicz; Daniel D. Fetterley

[57] ABSTRACT

A voltage limit circuit for phase controlled rectifiers avoids shoot-through and limit cycling conditions by limiting the d.c. output voltage of the rectifier bridge. The circuitry follows a voltage reference signal as long as the reference signal is less than an input derived from the a.c. voltage applied to the bridge, reduced by the volt-seconds required for commutation. Should the reference signal exceed the a.c. derived input, the a.c. derived input limits the maximum available d.c. voltage. To this end, a voltage reference signal provides an output signal corresponding to the desired output voltage of the bridge. A slew limit circuit limits the rate by which the output signal may be changed. A magnitude limit circuit is coupled to the output of the slew limit circuit and provides a reference signal for the firing circuit of the rectifier bridge. The magnitude limit circuit receives the a.c. voltage derived limiting signal for limiting the reference signal to a magnitude not greater than that established by the limiting signal. The limiting signal is obtained in a commutating volt-seconds subtraction circuit that reduces an appropriately scaled a.c. voltage by an amount necessary to establish the volt-seconds required for commutation of the controlled rectifiers.

13 Claims, 7 Drawing Figures

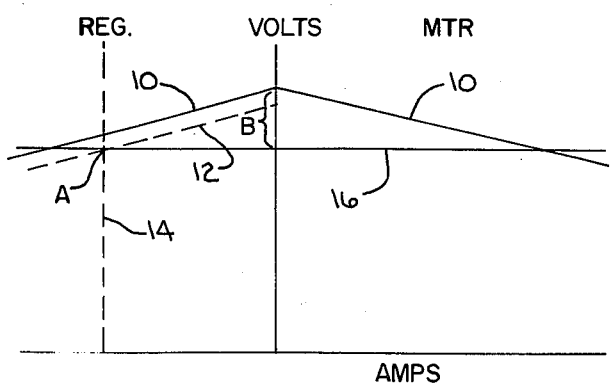
FIG.1
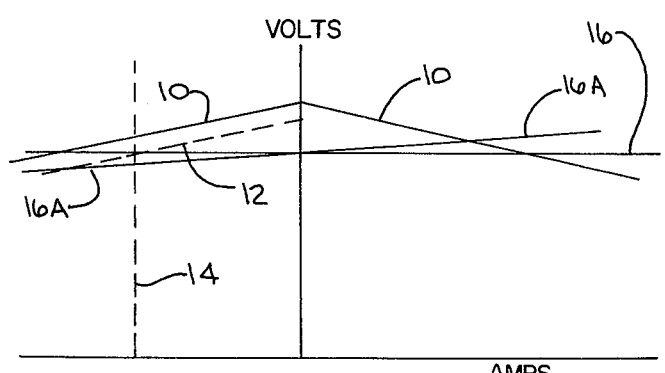
FIG.4
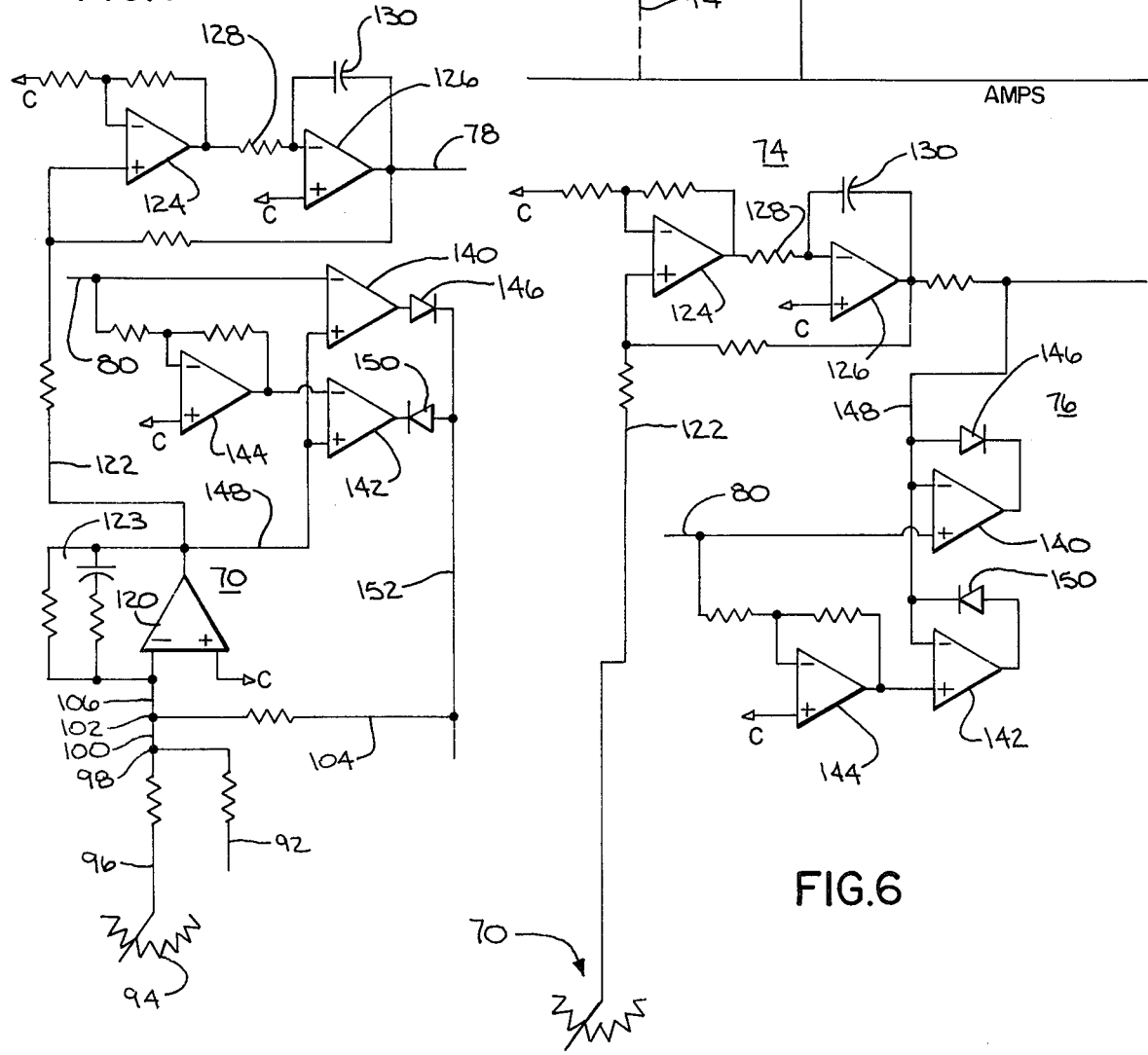
FIG.7
FIG.6

VOLTAGE LIMIT PROTECTION CIRCUIT FOR PHASE CONTROLLED RECTIFIERS

The present invention relates to circuitry for providing voltage limit protection to phase controlled rectifiers. Such circuitry may find use in conjunction with the phase controlled rectifiers employed in d.c. motor drives that obtain regeneration by reversing the motor armature current while maintaining the direction of the motor field current. The protection provided by the circuit prevents shoot-through conditions from occurring in the controlled rectifiers. It also avoids the instabilities and over currents occurring in such a drive at light loads. Such conditions are commonly termed "limit cycling".

Shoot-through typically occurs in rectifier bridges operating at greatly retarded firing angles with loads producing a counter e.m.f., such as d.c. motor armatures. Under such conditions, if the commutation between a pair of the rectifiers in the bridge is delayed past a critical point with respect to the applied a.c. voltages, the voltages thereafter assume conditions inappropriate for rectifier commutation. It becomes impossible to commutate from one rectifier of the pair to the other rectifier of the pair until a subsequent point at which a.c. voltages favorable to commutation reoccur. The term "shoot-through" connotes this lack of control and the resulting conditions in the phase controlled rectifiers.

Armature reversing, direct current regenerative motor controls employ two armature current power supplies with phase controlled rectifier bridges. The power supplies are connected in parallel with the armature so that one power supply supplies current in one direction and the other power supply supplies current in the other direction. When reversing the armature current, it is essential that one supply be deenergized before the other is turned on to avoid a short circuit between the supplies. The lack of control associated with shoot-through and/or limit cycling is highly detrimental to the precise control of the power supplies.

Shoot-through may be eliminated by insuring that the controlled rectifiers are always commutated in advance of the critical point. This may be accomplished by limiting the amount by which the firing pulses to the controlled rectifiers may be retarded by the firing circuit for the rectifiers. It may also be accomplished by providing a separate "tail end" pulse in advance of the critical point that is independent of the condition of the regulator for the firing circuit.

However, such techniques arbitrarily limit the voltage range of the motor control and hence its operational capabilities. To avoid such limitations, so-called "smart" or "slippery" tail end pulses have been utilized. With this technique, the application of the tail end pulses is dependent on the sensed operative condition in the motor and control, such as motor current, circuit impedance, and supply voltage. The tail end pulses are applied only if conditions engendering shoot-through are present. While effective, such a scheme is expensive because of the sensory and control circuitry required. Also, tail end pulses may not avoid limit cycling.

Another approach is to utilize a voltage regulated power supply for the motor. By regulating or clamping the voltage to which the motor control may be forced during operation to a fixed magnitude obtained from predetermined design criteria, the attainment of shoot-through conditions can be avoided.

This approach does not offer shoot-through protection when the a.c. voltage drops below design levels, since the reduced a.c. voltage alters the commutating voltages available and the timing of the commutation of the controlled rectifiers necessary to prevent shoot-through. Also, unless a slew limit, i.e. a rate of change limit, is provided, such a fixed voltage reference clamp can allow shoot-through when making a rapid transition from regeneration to motoring at high voltage.

It is the object of the present invention to provide improved circuitry for preventing shoot-through in phase controlled rectifiers, including those utilized in armature reversing regenerative motor controls. The circuitry also avoids the limit cycling condition.

The improved circuitry is premised on the realization that while the safe commutating point at which shoot-through can be avoided is determined by the motor current, the a.c. circuit impedance, and the applied a.c. voltage, the latter factor is most critically determinative. The circuitry is so constructed to follow an input reference signal to the motor control as long as this reference is less than an input derived from the applied a.c. voltage reduced by the volt-seconds required for commutation. Should the reference signal exceed the a.c. voltage derived input, the a.c. voltage driven input limits the maximum available d.c. voltage. This insures that shoot-through cannot occur. Should the a.c. voltage be reduced, the a.c. voltage derived limiting input is also reduced, thereby continuing to insure that shoot-through will not occur, even under reduced a.c. voltage conditions.

The circuitry of the present invention results in less restriction to the normal operating range of the motor control than techniques heretofore employed. The present invention retains the ability to provide proper control of the rectifiers under light load, discontinuous current conditions found with use of regulated power supplies.

The circuitry of the present invention provides the same reliability to the operation of the motor control as the earlier techniques but over the greater normal operating range noted above.

When operating in an extended speed range as a result of field weakening, the present invention permits operation of the d.c. motor at the highest power factor commensurate with insured commutation.

The invention may be further understood by reference to the drawing in which:

FIG. 1 is a voltage-current graph showing operation of a d.c. motor with the protective circuitry of the present invention;

FIG. 4 is a voltage-current graph similar to FIG. 1 showing operation of the modified embodiment of the improved circuitry of the present invention shown in FIG. 5;

FIG. 6 is a detailed circuit showing one embodiment of the slew limit circuit and magnitude limit circuit incorporated in the improved circuitry of the present invention; and FIG. 7 is a schematic diagram showing another embodiment of the slew limit circuit and magnitude limit circuit.

FIG. 1 shows a voltage-current diagram for two quadrants of operation of a d.c. motor. Motor voltage is shown on the ordinate. Motor current is shown on the abscissa. Motoring operation of the motor in one direction of rotation is considered to be in the righthand quadrant of FIG. 1 and regenerative operation in the lefthand quadrant. It will be appreciated that two additional quadrants exist below the abscissa for the other direction of rotation with motoring operation in a lower lefthand quadrants and regenerative operation in the lower righthand quadrant. The motoring and regenerative operation described in connection with the two quadrants shown in FIG. 1 correspondingly applies to the two quadrants not shown.

The maximum voltage available from a rectifier bridge energizing the motor is indicated by the line 10 in FIG. 1. The line is sloped as a result of the increasing voltage consumed in the commutation notches of the controlled rectifiers as the current through the bridge increases.

The commutation of a controlled rectifier in the bridge from the conductive state to the non-conducting state requires a predetermined number of volt-seconds. This predetermined number of volt-seconds includes those required to reduce the current through the controlled rectifier to zero so that commutation can occur, as well as a fixed number of volt-seconds characterized as a margin or safety factor. This factor is necessary to insure that commutation will, in fact, occur in advance of the critical point beyond which commutation will not be possible.

Line 12 in FIG. 1 shows the voltage remaining after the voltage necessary to provide the predetermined number of volt-seconds required to insure commutation of the controlled rectifiers in the rectifier bridge has been reserved.

The line 14 represents the maximum current condition of the motor in the regenerative quadrant. The intersection of voltage line 12 and maximum current line 14 has been indicated as point A in FIG. 1. To avoid shoot-through, this is the maximum voltage that can be applied to the motor by the rectifier bridge. The line 16 shows the horizontal extension of point A across the current range of the motor in both the regenerative and motoring quadrants.

The present invention operates to insure that the d.c. voltage applied by the rectifier bridge to the motor will never exceed the value indicated by line 16, thereby insuring that sufficient commutating volt-seconds exist for all operative conditions of the motor, including the critical maximum current, regenerative condition.

Should the applied a.c. voltage input to the bridge decrease, the graph shown in FIG. 1 is moved downward on the ordinate. The present invention acts to insure that the volt-seconds required for commutation remains adequate even though the a.c. voltage has decreased: that is, that the difference between the applied a.c. voltage and the maximum d.c. voltage remains adequate even though the a.c. voltage has decreased.

Figure 2:
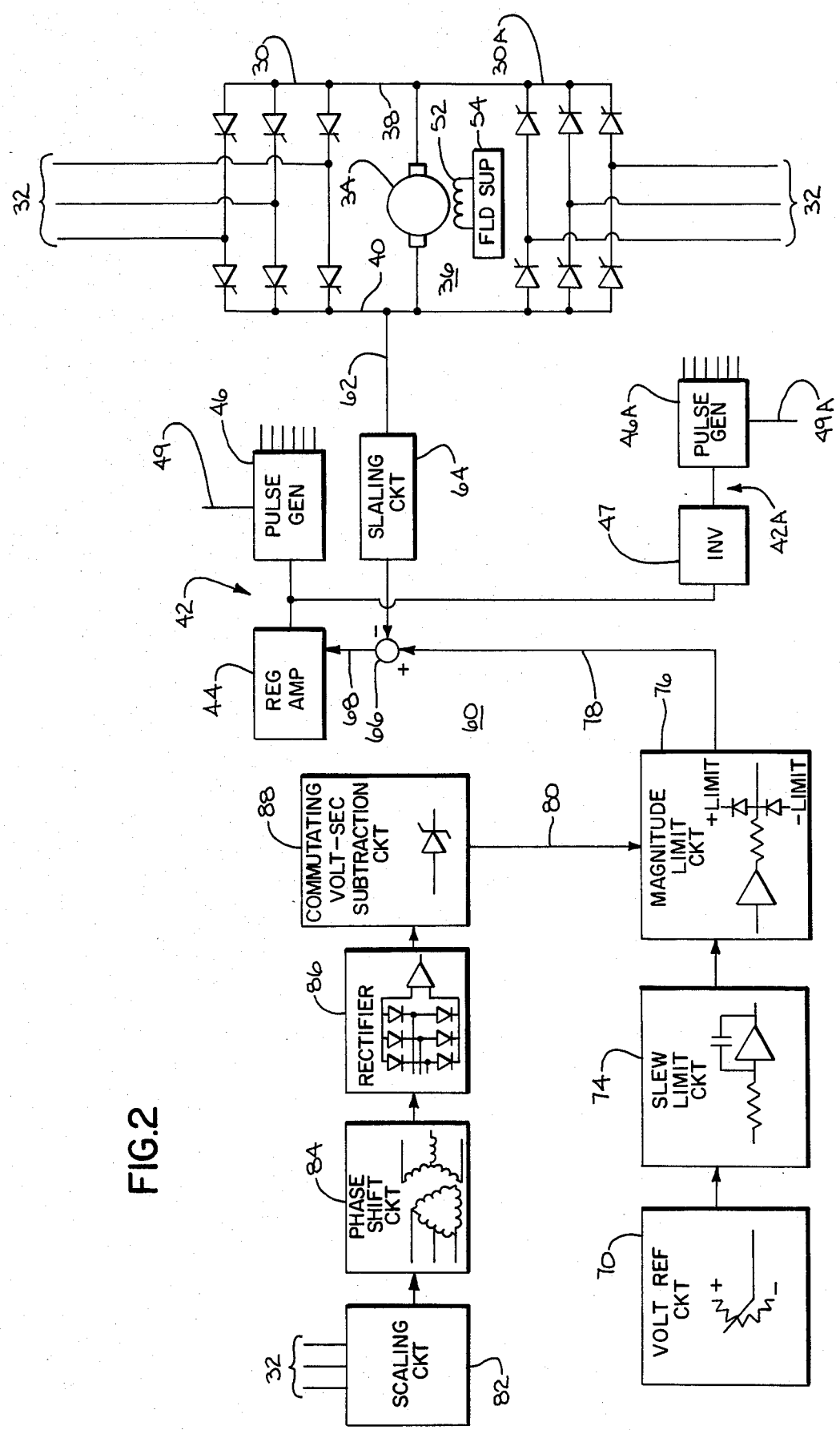
FIG. 2 is a schematic diagram showing one embodiment of the improved circuitry of the present invention along with the related motor control circuitry.

FIG. 2 schematically shows circuitry for carrying out the present invention. FIG. 2 shows full wave phase controlled rectifier bridge 30 typically employed in a d.c. motor control providing one direction of current flow to the motor armature. The a.c. side of bridge 30 is connected to three phase a.c. supply mains 32. The d.c. side of bridge 30 is connected to the armature 34 of d.c. motor 36 by conductors 38 and 40. The phase controlled rectifiers of rectifier bridge 30 are rendered conductive by firing pulses provided by firing circuit 42 comprised of regulating amplifier 44 and pulse generator 46.

A second full wave phase controlled rectifier bridge 30A is connected in anti-parallel with rectifier bridge 30 and armature 34 of motor 36 to provide current in the opposite direction to the motor. Firing circuit 42A controls rectifier bridge 30A. The output of regulating amplifier 46 may be provided to inverter 47 connected to pulse generator 46A. One or the other of pulse generators 44 and 44A is rendered operative by enabling signals provided in conductors 49 and 49A.

Current circulates through rectifier bridge 30 and motor armature 34 in the counterclockwise direction and circulates through rectifier bridge 30A and motor armature 34 in the clockwise direction.

Motor 36 includes field winding 52 connected to, and energized by, field supply 54. A permanent magnet field can be used, if desired.

To operate motor 36, field winding 52 is energized by field supply 54. In the motoring operation of motor 36, the controlled rectifiers of one or the other of rectifier bridges 30 or 30A are rendered conductive, depending on the desired direction of rotation of motor 36. For example, the rectifiers of rectifier bridge 30 may be rendered conductive by firing circuit 42. This circulates current in a counterclockwise direction through armature 34 of motor 36 to rotate armature 34 in the desired direction.

To undergo regenerative operation, the controlled rectifiers of rectifier bridge 30 are deenergized, to terminate the counterclockwise current flow through motor armature 34, and rectifier bridge 30A is energized to provide clockwise current flow through motor armature 34. The direction of current flow in field winding 52 is not changed. The reversal of the armature current while maintaining the field current in the same direction, regeneratively brakes motor 36 as it rotates in the desired direction.

FIG. 2 also shows the protection circuitry 60 of the present invention. Protection circuitry 60 is coupled to the output of rectifier bridges 30, 30A to sense the d.c. output voltage of rectifier bridges to motor armature 34. Scaling circuit 64 is interposed in conductor 62 to scale the d.c. voltage to a level appropriate for the operation of circuit 60. Conductor 62 is connected to summing junction 66 to provide a scaled d.c. voltage feedback signal to the summing junction. The output of summing junction 66 is provided in conductor 68 to regulating amplifier 44 as the controlling signal to the amplifier.

D.C. voltage reference circuit 70 provides a signal corresponding to the desired operating voltage of motor 36. A bipolarity signal may be provided, the polarity of which determines the direction of motor rotation. The schematically shown reference potentiometer may be used for this purpose. The selection of bridge 30 or 30A may be determined by the desired direction of current flow, either clockwise or counterclockwise, through application of the appropriate enabling signal in conductors 49 or 49A.

The output of d.c. voltage reference circuit 70 is provided to slew limit circuit 74, hereinafter described. In general, slew limit circuit 74 provides a limit to the rate at which the magnitude of the signal from d.c. voltage reference circuit 70 may be changed. Slew limit circuit may comprise the schematically shown operational amplifier having an associated R-C circuit. It prevents transient over-shoots in the operation of the rectifier voltage regulator and unacceptable firing delays due to the sampled data nature of rectifier operation.

The output of slew limit circuit 74 passes through magnitude limit circuit 76 to conductor 78 connected to summing junction 66. The signal in conductor 78 comprises the voltage reference signal to summing junction 66.

As its name implies, magnitude limit circuit 76 acts to selectively limit the magnitude of the reference signal. Magnitude limit circuit 76 is diagrammatically shown in FIG. 2 as comprising an operational amplifier, the input of which receives the signal from slew limit circuit. The output of the operational amplifier passes through an impedance to the junction of a pair of similarly poled diodes connected in series. The anode of one diode is connected to a positive limit signal. The cathode of the other diode is connected to a negative limit signal. The diodes thus serve to clamp or limit the magnitude of the reference signal provided from magnitude limit circuit 76 to that corresponding to one or the other of the limit signals. In circuitry 60, conductor 80 provides the limiting signal. The output of magnitude limit circuit 76 in conductor 78 cannot exceed that established by the magnitude of the signal in conductor 80.

The signal in conductor 80 is derived from the a.c. voltage in mains 32. The voltage from a.c. mains 32 is passed through scaling circuit 82 that provides the appropriate scaling to reduce the line voltage to a suitable level for the operation of circuitry 60.

In order to provide proper operation of circuitry 60, it is necessary that the a.c. voltage used for the magnitude limit be a true representation of the actual a.c. line voltage. Such a voltage is particularly necessary at greatly advanced or greatly retarded firing angles. If this voltage can be obtained ahead of impedances in a.c. mains 32, such as chokes in the motor control, such a true representation can be easily obtained.

However, in many cases the only accessible a.c. voltage is at the a.c. terminals of the controlled rectifier bridge. This voltage is distorted by the commutation notches from the rectifiers in rectifier bridge 30 or 30A.

The output of scaling circuit 82 is thus provided to phase shift circuit 84 that shifts the phase of the a.c. voltage from scaling circuit 82 with respect to the voltages in a.c. lines 32 so that a rectified voltage without the commutation notches may be obtained for control purposes. To this end, phase shift circuit 84 may comprise the wye-delta transformer shown schematically in FIG. 2, that provides an actual phase shift in the polyphase sense, and not in the sense of an inductive-capacitive filter.

The output of phase shift circuit 84 is provided to rectifier circuit 86 that provides full wave rectification to the signal by the schematically shown full wave rectifier and buffer amplifier.

The output of rectifier circuit 86 is provided to commutating volt-seconds subtraction circuit 88 that establishes the limiting signal in conductor 80. This signal is obtained by reducing the signal from rectifier circuit 86 by an amount corresponding to amount B shown on the ordinate of FIG. 1. As noted, amount B is the difference between the maximum output voltage of rectifier bridge 30 and the maximum safe output voltage 16 of rectifier bridge 30, 30A at maximum regenerating current.

Commutating volt-seconds subtraction circuit 88 may incorporate a Zener diode to remove the necessary portion of the a.c. voltage. The output of commutating volt-seconds subtraction circuit is provided in conductor 80 to magnitude limiting circuit 76.

It is preferable that the removed portion B of the a.c. voltage remain constant even if the level of the a.c. voltage in a.c. mains 32 varies. A Zener diode having a fixed voltage drop regardless of the applied voltage will remove the constant portion B independently of the applied voltage. Because the permissible d.c. voltage is the average of that occurring during the conducting interval, it may be desirable to provide some filtering to the output signal in conductor 80 to avoid unduly limiting the magnitude limit signal.

In the operation of circuitry 60, magnitude limit circuit 76 operates so that the voltage reference signal from voltage reference circuit 70 is present in conductor 78 as long as the signal in conductor 80 from commutating volt-seconds subtraction circuit 88 is greater than the reference signal. This indicates that motor 34 is operating at a voltage below line 16 in FIG. 1. There is no danger of shoot-through under these conditions.

Should voltage reference circuit 70 call for a voltage in excess of that indicated by the line 16 in FIG. 1, magnitude limit circuit 76 will act to limit the output signal in conductor 78 to the safe level 16 by the action of the limit signal existing in conductor 80. Shoot-through, and particularly, shoot-through at the maximum current, regenerating condition is prevented.

If the a.c. voltage in lines 32 drops, the signal from commutating volt-seconds subtraction circuit 88 in conductor 80 will continue to indicate the existing a.c. voltage reduced by the portion B in FIG. 1, thereby to maintain the necessary voltage limit under reduced a.c. voltage conditions. This insures that even under such reduced voltage conditions, sufficient volt-seconds will exist to insure that the controlled rectifiers are commutated off and shoot-through is avoided.

Figure 3:
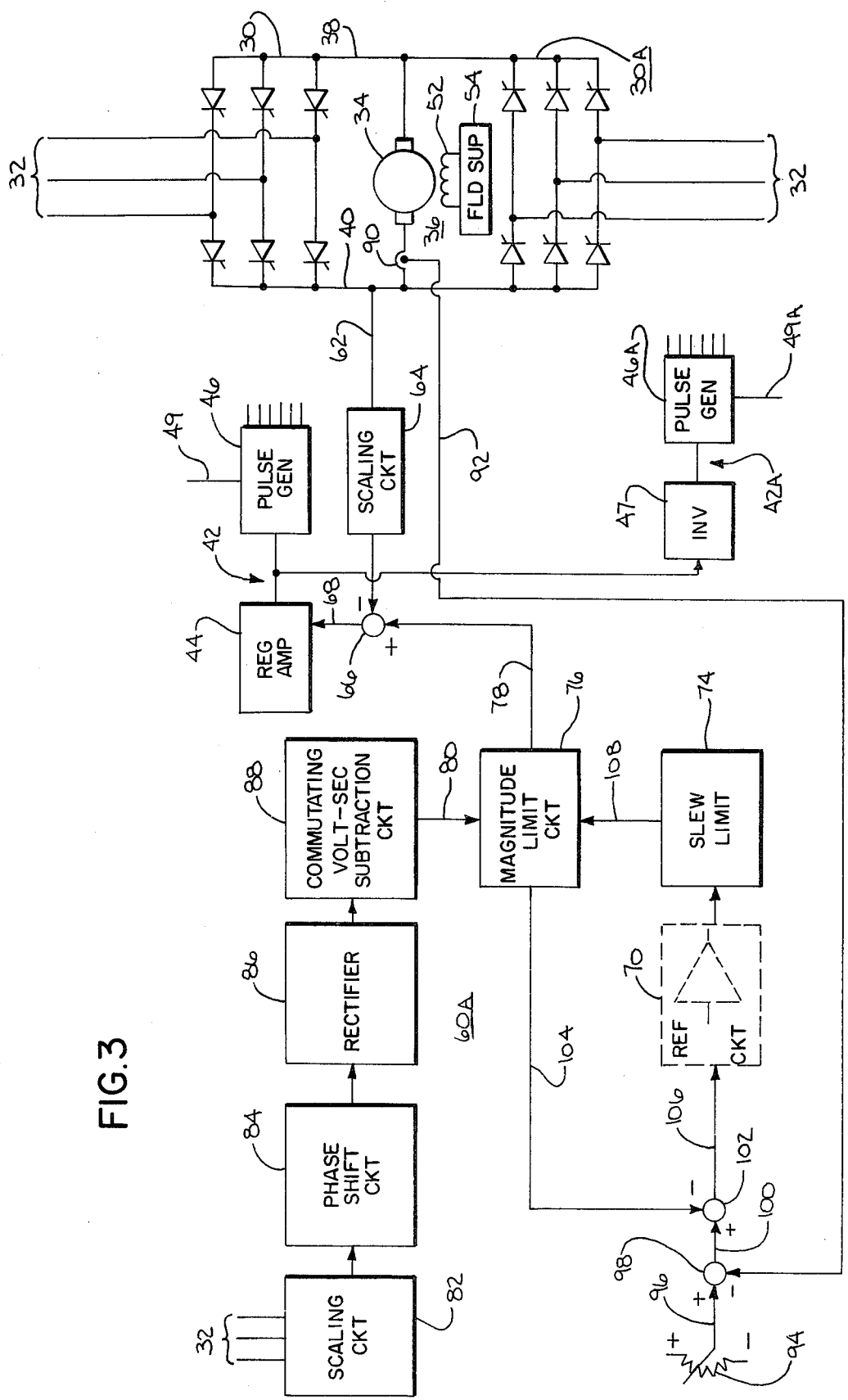
FIG. 3 is a schematic diagram showing a modified embodiment of the improved circuitry of the present invention incorporating a current regulating loop.

FIG. 3 shows an embodiment of the present invention suitable for use in a motor control having an armature current regulating loop. Elements similar to those shown in FIG. 2 are given similar identifying numerals. To form the current loop, an armature current sensor 90 is provided in series with armature 34. Sensor 90 provides a feedback signal in conductor 92 proportional to the current through armature 34. Potentiometer 94 provides a current reference signal in conductor 96. The signal in conductors 92 and 96 are provided to summing junction 98 and the difference signal provided in conductor 100. The signal in conductor 100 is provided to a second junction 102. Summing junction 102 also receives a signal in conductor 104 from magnitude limit circuit 76, indicative of any difference between the signals in conductor 80 and conductor 108, the output of slew limit circuit 74. The output of summing junction 102 in conductor 106 is provided to reference circuit 70.

The operation of circuitry 60A is essentially the same as circuitry 60 shown in FIG. 2, except that the signal from summing junction 102 forms the reference signal to reference circuit 70. Magnitude limit circuit 76 determines whether the voltage reference signal in conductor 108 exceeds the voltage limit signal in conductor 80. If it does, a signal is provided in conductor 104 to summing junction 102 to reduce the signal in conductor 108 to a value corresponding to the output of commutating volt-seconds subtraction circuit 88.

The signal in conductor 104 to summing junction 102 from magnitude limit circuit 76 smooths the recovery from the limit condition by avoiding undesired operation of the amplifier that may be employed in reference circuit 70. The accumulation of error or other signals, termed "windup" and tending to cause instability in the regulation is avoided.

With the operation of circuitry 60 shown in FIG. 2 to produce the constant maximum d.c. voltage indicated by the horizontal line 16 in FIG. 1, protection is provided under the critical regenerating condition at maximum current 14. However, restrictions are imposed on the d.c. voltage available at other, less critical, conditions. These restrictions are not as great as those encountered with prior art techniques, such as tail end pulses.

The effect of this restriction can be lessened by providing an upward slope to the line 16 in FIG. 1 toward the less critical motoring quadrant, as shown in FIG. 4 by the line 16A. This increases the amount of d.c. voltage available in the motoring quadrants. The slope of the line 16A is in the nature of IR compensation.

Figure 5:
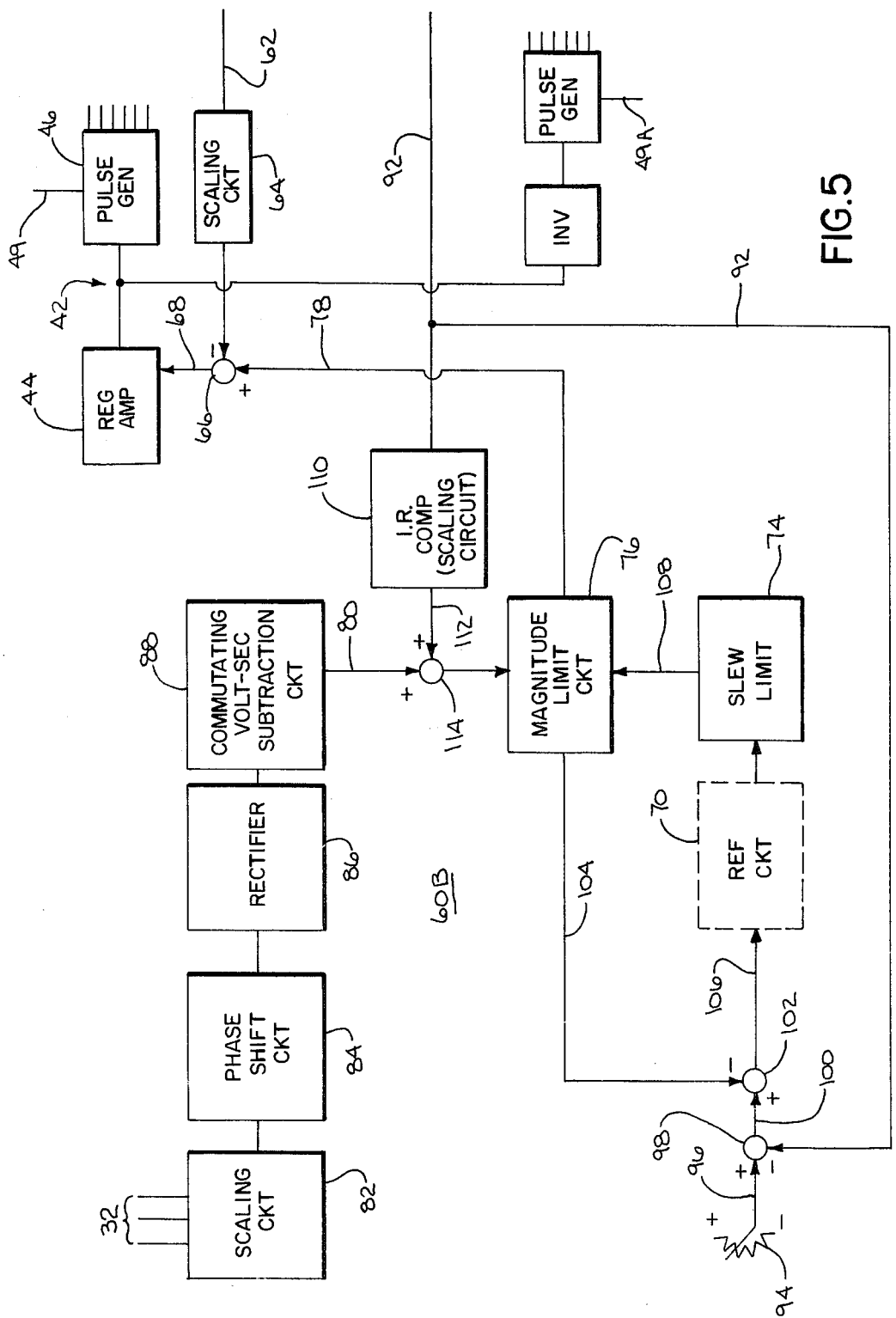
FIG. 5 is a schematic diagram showing another modification of the circuitry of the present invention.

To achieve the slope to the d.c. voltage shown by line 16A, a current signal is inserted between the output of commutating volt-seconds subtraction circuit 88 and magnitude limit circuit 76, as in circuitry 60B shown in FIG. 5. The signal proportional to current in conductor 92 is scaled in scaling circuit 110 and provided in an algebraically summing manner in conductor 112 to summing junction 114 at the input to magnitude limit circuit 76. For positive, motoring currents the voltage limit signal to magnitude limit circuit 76 is increased by the current signal in conductor 112. For reversed, or negative, regenerating current, the signal to magnitude limit circuit 76 is decreased by the current signal in conductor 112. The result is the d.c. voltage limit indicated by the line 16A in FIG. 4.

FIG. 6 shows a detailed schematic diagram of slew limit circuit 74 and magnitude limit circuit 76 suitable for use in circuitry 60 of FIG. 2. The d.c. voltage reference signal from voltage reference circuit 70 is provided in conductor 122 to slew limit circuit 74. Slew limit circuit 74 includes a pair of operational amplifiers 124, 126. Input amplifier 124 is connected through resistor 128 to amplifier 126 having capacitor 130 in the feedback path. These elements form the slew limit circuit 74, diagrammatically shown in FIG. 2, in which the R-C circuit comprising resistor 128 and capacitor 130 limits the rate at which the output signal in conductor 78 changes.

The limitation placed on the rate of change of the voltage reference signal in conductor 78 depends on a number of factors. One of those factors is the delay in effecting a retardation of the firing angle of the phase controlled rectifiers in bridge 30, 30A. When the firing angle is to be advanced, the new conditions are immediately present. By contrast, when the firing angle is retarded, the rectifiers continue in the existing condition until the retarded firing angle is reached. There is thus a delay in response to retarding the firing angle that is accommodated by limiting the rate of change of the reference signal.

Another consideration is that regulating amplifier 46 typically has a strong integrating characteristic. When retardation of the firing angle is requested, an error signal is provided to regulating amplifier 46. The application of the error signal for the delay in the response, noted above, may allow a large enough signal accumulation in regulating amplifier 46, that its output will demand an unattainable condition of the phase controlled rectifiers. This could permit shoot-through to occur. Slew limit circuit 74 thus limits the rate of change of d.c. voltage reference signal and the rate at which retardation is requested of the regulating amplifier, so that the output of regulating amplifier does not demand unattainable conditions.

Magnitude limit circuit 76 includes a pair of operational amplifiers 140, 142. The voltage limit signal in conductor 80 is applied directly to one input of amplifier 140 and through inverting amplifier 144 to one input of amplifier 142. Diode 146 is connected between the output of amplifier 140, conductor 148, and the other input of amplifier 140. Diode 150, oppositely poled with respect to diode 148, is connected between the output of amplifier 142, conductor 148, and the other input of amplifier 142. Conductor 148 is connected to conductor 78.

The magnitude of the signal in conductor 78 to regulating amplifier 46 is clamped to the level of the signal in conductor 80 by the operation of diodes 146 and 150 and amplifiers 140 and 142 to provide the desired limiting action. The opposite poling of diodes 146 and 150 obtains the limiting action for both signal polarities.

FIG. 7 shows a detailed schematic diagram of a slew limit circuit 74 and magnitude limit circuit 76 suitable for use in circuitry 60A. Elements of the circuitry shown in FIG. 7 that are similar to those shown in FIG. 6 have been identified by the same reference numerals. Oppositely poled diodes 146 and 150 are connected in the outputs of amplifiers 140 and 142, respectively. Diodes 146 and 150 are also connected to conductor 152 providing a signal indicative of the limit condition including that in conductor 104 to summing junction 102. The signal in conductor 152 may be used for control purposes when the circuitry is included in other regulating loops. It may also be used as an input to a motor field regulator. Conductor 148 is connected to the output of amplifier 120 in voltage reference circuit 70 to provide the limiting action at the output of the reference circuit amplifier.

While the reduction in the a.c. derived voltage necessary to provide the limit signal in conductor 80 has been shown as obtained by a Zener diode in commutating volt-seconds subtraction circuit 88, it will be appreciated that the diodes in the rectifier bridge in rectifier 86 could also be used for this purpose.

Further, while voltage limit protection circuit 60 has been described above as reducing the a.c. derived voltage by a fixed amount B to provide voltage limit protection, other types of reduction, such as a percentage reduction may be employed. If the reduction is established as a certain percentage of the output 10 of rectifier bridge 30, 30A, it will be understood that the voltage difference between voltages 10 and 12 will decrease as the voltage in a.c. mains 32 and voltage 10 decreases. This may lead to shoot-through as the a.c. voltage decreases. This can be avoided by establishing the difference between voltage 10 and 12 at rated voltage 10 sufficiently large, that a sufficient voltage difference will remain at greatly reduced a.c. main voltages. Or, the difference at rated voltage 10 may be established at a level sufficient to give shoot-through protection for any anticipated a.c. mains voltage reduction.

Various modes of carrying out the invention are contemplated as being within the scope of the following claims particularly pointing out and distinctly claiming the subject matter which is regarded as the invention.

I claim:

1. Circuitry for providing shoot-through avoiding voltage limit protection to controlled rectifiers interposed between a.c. voltage power mains and a d.c. load, said rectifiers providing power supplying and regenerating operation to the d.c. load, said rectifiers being commutated among the a.c. voltages of the power mains by a firing circuit, said protection circuitry providing a reference signal for the voltage regulator of the firing circuit and comprising:

reference signal means providing an output signal corresponding to the desired output voltage of the controlled rectifiers;

magnitude limit means coupled to the output of said reference signal means for providing the reference signal for the voltage regulator, said magnitude limit means receiving a limiting signal for limiting the reference signal to a magnitude not greater than that established by the limiting signal;

circuit means providing a d.c. voltage representative of the a.c. voltage existing in the a.c. power mains; and commutating volt-seconds subtraction means coupled to said circuit means for reducing the d.c. voltage by a predetermined amount sufficient to avoid shoot-through in the rectifiers, said commutating volt-seconds subtraction circuit providing the reduced signal to said magnitude limit circuit as the limiting signal.

2. The circuitry according to claim 1 wherein said commutating volt-seconds subtraction means reduces the d.c. voltage by a fixed amount.

3. The circuitry according to claim 2 wherein said commutating volt-seconds subtraction means reduces the d.c. voltage by a fixed voltage.

4. The circuitry according to claim 3 wherein said commutating volt-seconds subtraction means reduces the d.c. voltage by an amount corresponding to the sum of the voltage consumed by commutating at maximum regenerative current and a voltage representing a commutating safety factor.

5. The circuitry according to claim 1 wherein said circuit means includes rectifier means for rectifying the a.c. voltage to provide the d.c. voltage.

6. The circuitry according to claim 5 wherein said rectifier means provides the reduction in the d.c. voltage.

7. The circuitry according to claim 1 wherein said circuitry includes a phase shift means coupled to said circuit means for phase shifting the a.c. voltage.

8. The circuitry according to claim 1 wherein said circuitry includes slew limit means interposed between said reference signal means and said magnitude limiting means for limiting the rate of change of the signal from said reference signal means.

9. The circuitry according to claim 1 wherein said magnitude limit circuit provides an output indicative of the limit condition.

10. The circuitry according to claim 1 wherein the controlled rectifiers and d.c. load includes means providing a current feedback signal and wherein said reference signal means includes means providing a signal and summing junction means receiving the reference signal and feedback signal for providing an error signal as a voltage reference signal.

11. The circuitry according to claim 10 wherein said magnitude limit circuit provides an output signal indicative of the limit condition, said magnitude limit circuit output signal being supplied to a summing junction receiving said error signal for providing a voltage reference signal.

12. The circuitry according to claim 1 wherein said circuitry includes means responsive to the current in the controlled rectifiers and d.c. load and coupled to the output of said commutating volt-seconds subtraction means for altering the magnitude of the limit signal in accordance with the magnitude of the current.

13. The circuitry according to claim 12 wherein said current responsive means is further defined as algebraically altering the limit signal in accordance with the magnitude and polarity of the current for increasing the available d.c. voltage in the power supplying operation of the controlled rectifiers and decreasing the available d.c. voltage in regenerative operation.

* * * * *